US012235968B2

(12) United States Patent
Wurster

(10) Patent No.: US 12,235,968 B2
(45) Date of Patent: Feb. 25, 2025

(54) AUTOMATED SOFTWARE VULNERABILITY DETERMINATION

(71) Applicant: MALIKIE INNOVATIONS LIMITED, Dublin (IE)

(72) Inventor: Glenn Daniel Wurster, Kitchener (CA)

(73) Assignee: Malikie Innovations Limited, Dublin (IE)

( * ) Notice: Subject to any disclaimer, the term of this patent is extended or adjusted under 35 U.S.C. 154(b) by 1169 days.

(21) Appl. No.: 16/226,121

(22) Filed: Dec. 19, 2018

(65) Prior Publication Data
US 2020/0202005 A1     Jun. 25, 2020

(51) Int. Cl.
*G06F 21/57*     (2013.01)
*G06F 9/30*     (2018.01)

(52) U.S. Cl.
CPC ........ *G06F 21/577* (2013.01); *G06F 9/30029* (2013.01)

(58) Field of Classification Search
CPC .... G06F 21/577; G06F 9/30029; G06F 8/658; G06F 21/57; G06F 2221/033
See application file for complete search history.

(56) References Cited

U.S. PATENT DOCUMENTS

| | | | | |
|---|---|---|---|---|
| 6,363,524 | B1 * | 3/2002 | Loy | G06F 8/65 717/170 |
| 7,797,752 | B1 * | 9/2010 | Vaidya | H04L 12/4641 726/27 |
| 8,479,297 | B1 * | 7/2013 | Edukulla | H04L 63/1433 713/188 |
| 2005/0005159 | A1 * | 1/2005 | Oliphant | H04L 63/1441 726/26 |
| 2011/0126288 | A1 * | 5/2011 | Schloegel | G06F 21/577 717/106 |
| 2014/0245376 | A1 * | 8/2014 | Hibbert | H04L 63/20 726/1 |

OTHER PUBLICATIONS

T. Takahashi et al.: "An Incident Object Description Exchange Format (IODEF) Extension for Structured Cybersecurity Information", https://tools.ietf.org/html/rfc7203.
MISP—Open Source Threat Intelligence Platform & Open Standards for Threat Information Sharing: https://www.misp-project.org.

(Continued)

*Primary Examiner* — Fatoumata Traore
*Assistant Examiner* — Carlton Johnson
(74) *Attorney, Agent, or Firm* — Botos Churchill IP Law LLP

(57) ABSTRACT

Software vulnerabilities affecting devices can be determined using a vulnerability identifier uniquely identifying a vulnerability and version check information for use in determining software versions affected by the vulnerability. The version check information comprises one or more version rules providing a definition of how a software version number is tokenized and one or more Boolean expressions on those tokens to identify impacted versions of software according to the one or more version rules. In checking software for a vulnerability, the software version is determined and checked using the Boolean expression according to the version definition.

22 Claims, 9 Drawing Sheets

(56) References Cited

OTHER PUBLICATIONS

European Search Report for EP19214800: European Patent Office, May 7, 2020.
J. Baker et al.: "The OVAL Language Specification Version 5.10.1", XP055692396, Jan. 20, 2012.
H. Rubinovitz: "oval:org.mitre.oval:def:3138", Jan. 7, 2005.
Anonymous: "OVAL Content Creation Tutorial | OVAL Documentation", XP055692899, Sep. 28, 2017.
D. Haynes et al.: "The OVAL Language Windows Component Model Specification", XP055692872, Jan. 1, 2012.
Semantic Versioning 2.0.0: https://semver.org, pp. 1-6.

* cited by examiner

FIG. 1 - Prior Art

AUTOMATED SOFTWARE VULNERABILITY DETERMINATION

TECHNICAL FIELD

The current disclosure relates to software vulnerabilities and in particular to determining vulnerabilities affecting software.

BACKGROUND

Electronic devices may be controlled by software executing on the devices. The software may be viewed as a number of interacting software components. Different companies, organizations and/or individuals may be responsible for developing and/or maintaining the different software components. One or more of the software components may have a vulnerability, or vulnerabilities, in the code of the software component that could be exploited to possibly cause the software or device to perform in an undesirable manner. Different versions of software components may be susceptible to a vulnerability while other versions of the software component are not.

Software vulnerabilities may affect multiple different versions of the software components. The version numbers of software components may be specified in any format desired by a developer. While such flexibility may be desirable to provide flexibility to developers, it makes machine comparisons of software versions difficult.

FIG. 1 depicts a current process for determining if a piece of software is vulnerable to one or more software vulnerabilities. The process is heavily dependent upon a human 102 to determine if particular vulnerabilities apply 104. The human 102 collects one or more vulnerability bulletins 106, 108, 110 that specify particular software vulnerabilities. The vulnerabilities are often distributed in a human readable format such as a pdf document. The individual must read the vulnerability reports, which each may have its own format and content, and then determine if any of the vulnerabilities relate to the software 112 or software components 114, 116 on the user's device or devices. Vulnerability reports may be collected by service providers, read by individuals and stored in a database that can then be used in scanning computer systems of subscribers to the service.

It would be desirable to reduce or eliminate an amount of human involvement in assessing if software is affected by a vulnerability.

BRIEF DESCRIPTION OF THE DRAWINGS

Features, aspects and advantages of the present disclosure will become better understood with regard to the following description and accompanying drawings in which.

DETAILED DESCRIPTION

Figure 1:
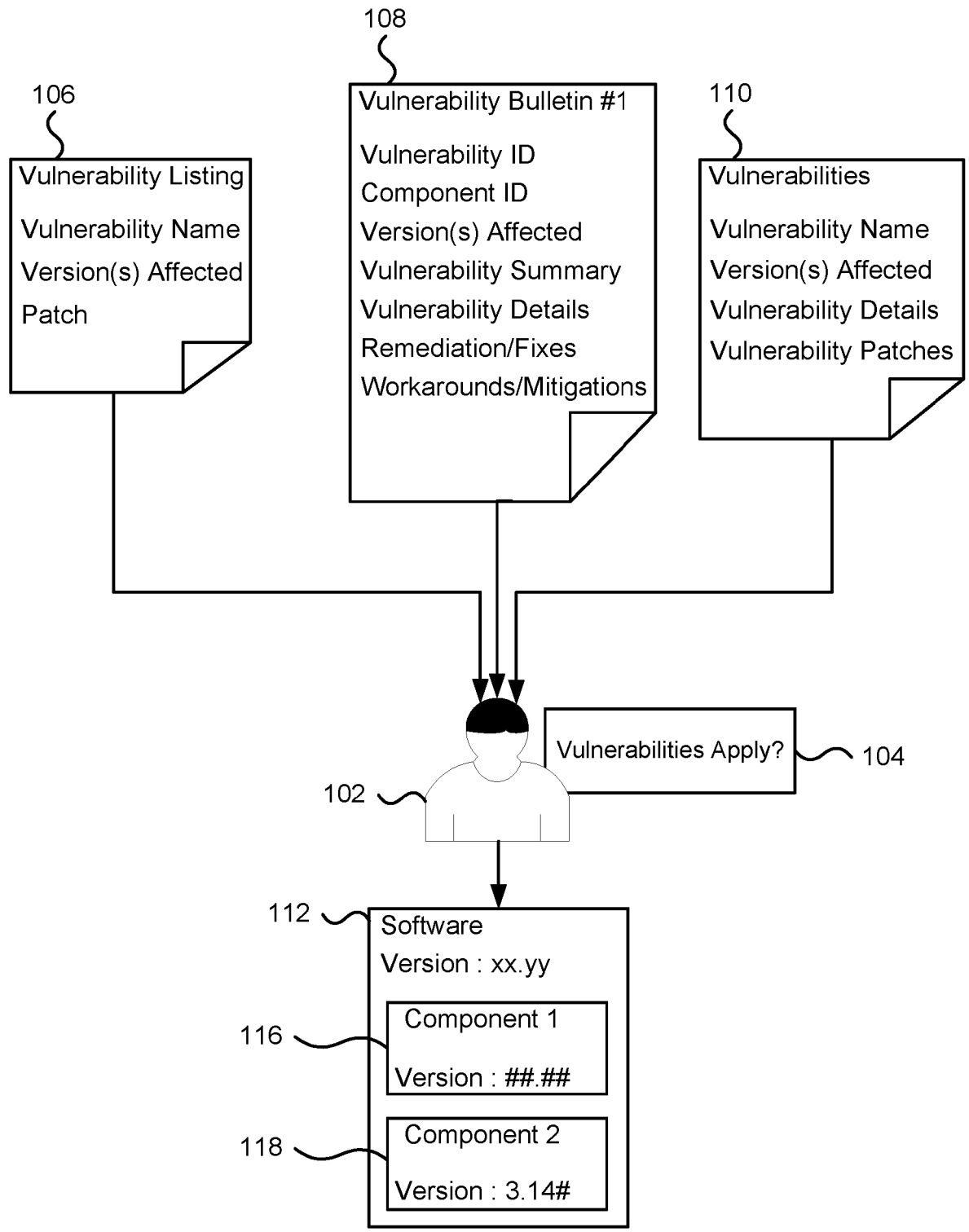
FIG. 1 depicts a prior art process for determining vulnerabilities that may affect software.

In accordance with the present disclosure there is provided a method for determining if a software component is susceptible to a vulnerability, the method comprising: accessing a vulnerability listing object comprising: a vulnerability identifier uniquely identifying a software vulnerability; and vulnerability causes information for use in determining software affected by the vulnerability, the vulnerability causes information comprising: patch information specifying one or more patches, each associating a patch token with a patch details identifying a software patch; a Boolean expression using one or more of the plurality of patch tokens, the Boolean expression identifying software patches associated with the vulnerability listing object; determining if software patches associated with the one or more patch tokens of the Boolean expression are present; and applying the determined presence of software patches to the Boolean expression; and indicating that the software component is susceptible to the software vulnerability based on the evaluation of the Boolean expression.

In a further embodiment of the method, the vulnerability listing object further comprises information for fixing the vulnerability.

In a further embodiment of the method, the information for fixing the vulnerability comprises: a second Boolean expression specifying one or more corrective patch tokens, which if applied as specified in the Boolean expression fix the vulnerability; corrective patch information for each of the one or more corrective patch tokens each associating the respective corrective patch token with a corrective patch location for retrieving the corrective patch.

In a further embodiment, the method further comprises: determining which of the one or more corrective patch identifiers to apply based on the Boolean expression; determining the respective corrective patch location from the corrective patch information; retrieving one or more corrective patches from the respective corrective patch locations; and applying each of the retrieved corrective patches.

In a further embodiment, the method further comprises: determining if each of the one or more retrieved corrective patches were successfully applied; and if one or more of the corrective patches were not successfully applied, providing a notification that one or more of the corrective patches were not successfully applied.

In a further embodiment, the method further comprises retrieving the vulnerability listing object from a network location provided by a base location comprising a website domain followed by a predetermined location identifier.

In a further embodiment of the method, the base location further comprises one or more of: a subdomain; and a path identifier.

In a further embodiment of the method, the vulnerability listing object further comprises: a product identifier indicating a software product; and one or more vulnerabilities affecting the product.

In a further embodiment of the method, the one or more vulnerabilities are specified within the vulnerability listing object indirectly by referencing a second vulnerability listing object.

In a further embodiment, the method further comprises determining one or more software components to be checked, wherein the software components to be checked are located on one or more of: a device that the method is performed by; and one or more devices different from the device that the method is performed by.

In a further embodiment of the method, the vulnerability listing object further comprises version check information comprising: one or more version rules providing a version definition of how a software version number is formed from a plurality of tokens; and a Boolean expression using one or more of the plurality of tokens, the Boolean expression identifying software versions associated with the vulnerability listing object; wherein the version check information is used to determine if software is vulnerable by: determining a version number of a software component to be checked for susceptibility to the software vulnerability; and applying the determined version number to the Boolean expression according to the one or more version rules.

In accordance with the present disclosure there is provided a device for determining if a software component is susceptible to a vulnerability, the device comprising: a processor for executing instructions; and a memory for storing instructions, which when executed by the processor configure the device to: access a vulnerability listing object comprising: a vulnerability identifier uniquely identifying a software vulnerability; and vulnerability causes information for use in determining software affected by the vulnerability, the vulnerability causes information comprising: patch information specifying one or more patches, each associating a patch token with a patch details identifying a software patch; a Boolean expression using one or more of the plurality of patch tokens, the Boolean expression identifying software patches associated with the vulnerability listing object; determine if software patches associated with the one or more patch tokens of the Boolean expression are present; and apply the determined presence of software patches to the Boolean expression; and indicate that the software component is susceptible to the software vulnerability based on the evaluation of the Boolean expression.

In a further embodiment of the device, the vulnerability listing object further comprises information for fixing the vulnerability.

In a further embodiment of the device, the information for fixing the vulnerability comprises: a second Boolean expression specifying one or more corrective patch tokens, which if applied as specified in the Boolean expression fix the vulnerability; corrective patch information for each of the one or more corrective patch tokens each associating the respective corrective patch token with a corrective patch location for retrieving the corrective patch.

In a further embodiment of the device, the executed instructions further configure the device to: determine which of the one or more corrective patch identifiers to apply based on the Boolean expression; determine the respective corrective patch location from the corrective patch information; retrieve one or more corrective patches from the respective corrective patch locations; and apply each of the retrieved corrective patches.

In a further embodiment of the device, the executed instructions further configure the device to: determine if each of the one or more retrieved corrective patches were successfully applied; and if one or more of the corrective patches were not successfully applied, provide a notification that one or more of the corrective patches were not successfully applied.

In a further embodiment of the device, the executed instructions further configure the device to retrieve the vulnerability listing object from a network location provided by a base location comprising a website domain followed by a predetermined location identifier.

In a further embodiment of the device, the base location further comprises one or more of: a subdomain; and a path identifier.

In a further embodiment of the device, the vulnerability listing object further comprises: a product identifier indicating a software product; and one or more vulnerabilities affecting the product.

In a further embodiment of the device, the one or more vulnerabilities are specified within the vulnerability listing object indirectly by referencing a second vulnerability listing object.

In a further embodiment of the device, the executed instructions further configure the device to determine one or more software components to be checked, wherein the one or more software components to be checked are located on one or more of: the device; and one or more external devices different from the device.

In a further embodiment of the device, the vulnerability listing object further comprises version check information comprising: one or more version rules providing a version definition of how a software version number is formed from a plurality of tokens; and a Boolean expression using one or more of the plurality of tokens, the Boolean expression identifying software versions associated with the vulnerability listing object; wherein the version check information is used to determine if software is vulnerable by: determining a version number of a software component to be checked for susceptibility to the software vulnerability; and applying the determined version number to the Boolean expression according to the one or more version rules.

In accordance with the present disclosure there is provided a method for determining if a software component is susceptible to a vulnerability, the method comprising: accessing a vulnerability listing object comprising: a vulnerability identifier uniquely identifying a software vulnerability; and version check information for use in determining software versions affected by the vulnerability, the version check information comprising: one or more version rules providing a version definition of how a software version number is formed from a plurality of tokens; and a Boolean expression using one or more of the plurality of tokens, the Boolean expression identifying software versions associated with the vulnerability listing object; determining a version number of a software component to be checked for susceptibility to the software vulnerability; and applying the determined version number to the Boolean expression according to the one or more version rules; and indicating that the software component is susceptible to the software vulnerability based on the evaluation of the Boolean expression.

In a further embodiment of the method, the vulnerability listing object further comprises information for fixing the vulnerability.

In a further embodiment of the method, the information for fixing the vulnerability comprises: a Boolean expression specifying one or more patch identifiers, which if applied as specified in the Boolean expression fix the vulnerability; and one or more patch details comprising: a patch identifier; and a patch location for retrieving the patch.

In a further embodiment, the method further comprises: determining which of the one or more patch identifiers to apply based on the Boolean expression; determining the respective patch location from the one or more patch details; retrieving one or more patches from the respective patch locations; and applying each of the retrieved patches.

In a further embodiment, the method further comprises: determining if each of the one or more retrieved patches were successfully applied; and if one or more of the patches were not successfully applied, providing a notification that one or more of the patches were not successfully applied.

In a further embodiment, the method further comprises retrieving the vulnerability listing object from a network location.

In a further embodiment of the method, the network location is provided by a base location comprising a website domain followed by a predetermined location identifier.

In a further embodiment, the method further comprises retrieving a plurality of vulnerability listing objects, including the vulnerability listing object, where each vulnerability listing object is retrieved from a respective network location having different base locations.

In a further embodiment of the method, the base location further comprises one or more of: a subdomain; and a path identifier.

In a further embodiment, the method further comprises determining the base location from a list of known base locations.

In a further embodiment of the method, the vulnerability listing object further comprises: a product identifier indicating a software product; and one or more vulnerabilities affecting the product.

In a further embodiment of the method, the one or more vulnerabilities are specified within the vulnerability listing object indirectly by referencing a second vulnerability listing object.

In a further embodiment, the method further comprises determining one or more software components to be checked.

In a further embodiment of the method, the one or more software components to be checked are located on a device that the method is performed by.

In a further embodiment of the method, the one or more software components to be checked are located on a plurality of devices.

In accordance with the present disclosure there is provided a device for determining if a software component is susceptible to a vulnerability, the device comprising: a processor for executing instructions; and a memory for storing instructions, which when executed by the processor configure the device to: access a vulnerability listing object comprising: a vulnerability identifier uniquely identifying a software vulnerability; and version check information for use in determining software versions affected by the vulnerability, the version check information comprising: one or more version rules providing a version definition of how a software version number is formed from a plurality of tokens; and a Boolean expression using one or more of the plurality of tokens, the Boolean expression identifying software versions associated with the vulnerability listing object; determine a version number of a software component to be checked for susceptibility to the software vulnerability; and apply the determined version number to the Boolean expression according to the one or more version rules; and indicate that the software component is susceptible to the software vulnerability based on the evaluation of the Boolean expression.

In a further embodiment of the device, the vulnerability listing object further comprises information for fixing the vulnerability.

In a further embodiment of the device, the information for fixing the vulnerability comprises: a Boolean expression specifying one or more patch identifiers, which if applied as specified in the Boolean expression fix the vulnerability; and one or more patch details comprising: a patch identifier; and a patch location for retrieving the patch.

In a further embodiment of the device, the executed instructions further configure the device to: determine which of the one or more patch identifiers to apply based on the Boolean expression; determine the respective patch location from the one or more patch details; retrieve one or patches from the respective patch locations; and apply each of the retrieved patches.

In a further embodiment of the device, the executed instructions further configure the device to: determine if each of the one or more retrieved patches were successfully applied; and if one or more of the patches were not successfully applied, provide a notification that one or more of the patches were not successfully applied.

In a further embodiment of the device, the executed instructions further configure the device to retrieve the vulnerability listing object from a network location.

In a further embodiment of the device, the network location is provided by a base location comprising a website domain followed by a predetermined location identifier.

In a further embodiment of the device, the executed instructions further configure the device to retrieve a plurality of vulnerability listing objects, including the vulnerability listing object, where each vulnerability listing object is retrieved from a respective network location having different base locations.

In a further embodiment of the device, the base location further comprises one or more of: a subdomain; and a path identifier.

In a further embodiment of the device, the executed instructions further configure the device to determine the base location from a list of known base locations.

In a further embodiment of the device, the vulnerability listing object further comprises: a product identifier indicating a software product; and one or more vulnerabilities affecting the product.

In a further embodiment of the device, the one or more vulnerabilities are specified within the vulnerability listing object indirectly by referencing a second vulnerability listing object.

In a further embodiment of the device, the executed instructions further configure the device to determine one or more software components to be checked.

In a further embodiment of the device, the one or more software components to be checked are located on the device.

In a further embodiment of the device, the one or more software components to be checked are located on one or more external devices.

Software vulnerabilities may affect different versions of software and as such it is necessary to determine if a particular software version is susceptible to a particular vulnerability. In order to automate, or at least partially automate, the determination of whether software is susceptible to a vulnerability it is necessary to be able to programmatically determine whether a particular software version on a device is specified as being susceptible to a vulnerability being checked. However, since each software component may specify version in different ways, it is difficult to programmatically determine if the software version is affected by the vulnerability with the affected versions of a vulnerability typically written as English sentences. As described in further detail below, a vulnerability listing object can be provided that provides details on a particular vulnerability including what software versions are susceptible to the vulnerability. In order to allow a software version to be compared to the specified susceptible versions, the vulnerability listing object comprises version check information that allows the programmatic comparison of versions regardless of the particular format a developer specifies the version in. The version check information comprises version rules providing a version definition of how the software version number is specified and a Boolean expression specifying version numbers of software according to the one or more version rules. A version number of a piece of software being checked can be applied to the Boolean expression according to the version definition, and if it evaluates as true, the software version may be determined as matching the software versions that are susceptible to the vulnerability. In addition to the version check information, the vulnerability listing object may further include information for fixing the vulnerability. The vulnerability listing object enables a device to automatically determine whether software is affected by a vulnerability and possibly take actions to address the vulnerability. The vulnerability listing object may be provided to a device checking for vulnerabilities, or the device may retrieve the vulnerability listing object from a network location. The particular location of the vulnerability listing object may be located at a location specified by a base location comprising a domain and a predetermined location identifier, allowing a device to easily locate vulnerability listing objects that may affect software or software components.

Figure 2:
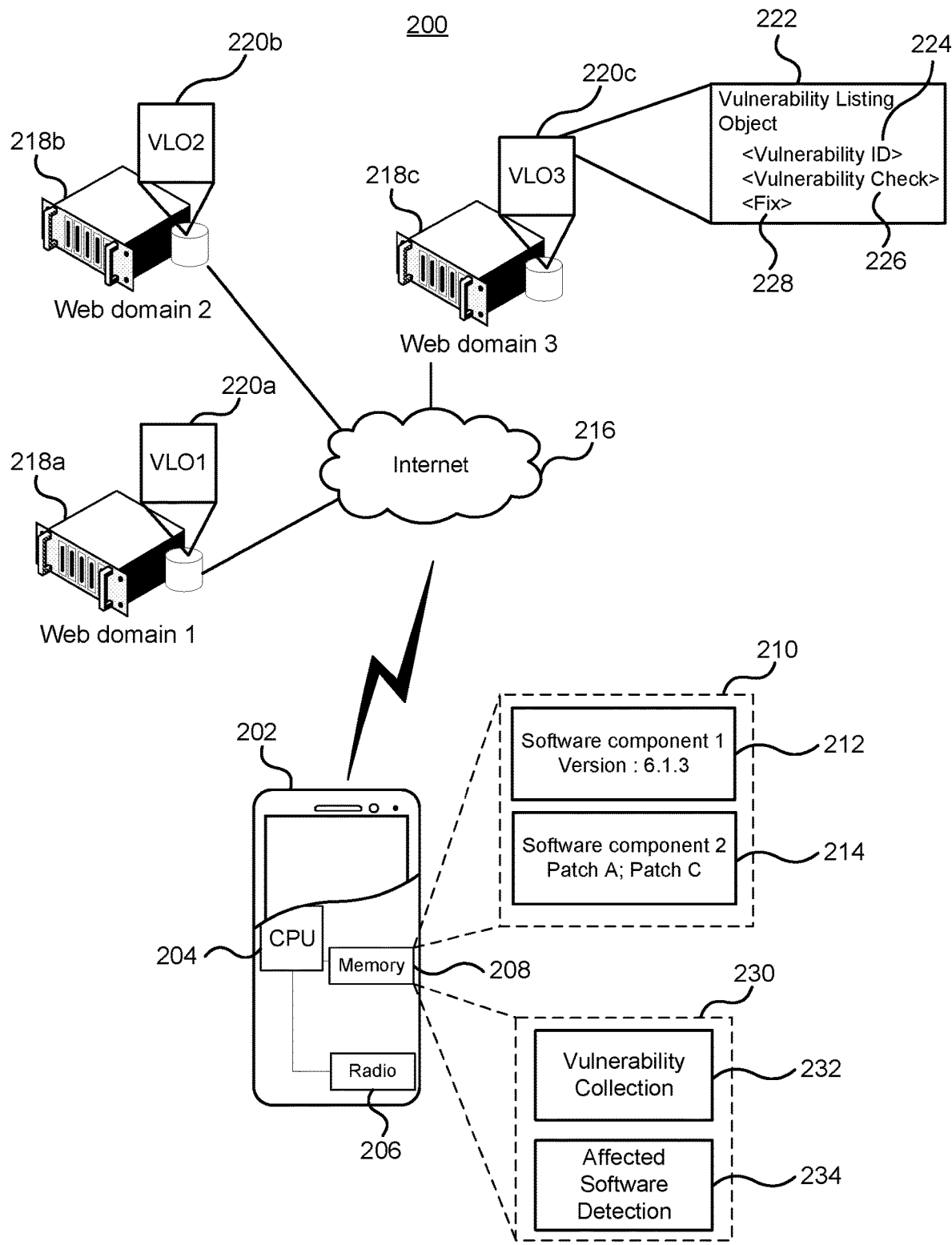
FIG. 2 depicts a system for determining vulnerabilities affecting software.

FIG. 2 depicts a system for determining vulnerabilities affecting software. The system 200 depicts a mobile phone 202, although the techniques described herein may be applied to a wide range of electronic devices. The mobile phone 202 comprises a processor (CPU) 204 for processing instructions to implement desired functionality. The mobile phone 202 includes one or more radios 206 for wirelessly communicating with other devices. A memory 208 may store both data and instructions that can be executed by the processor 204 to provide functionality. The functionality may include functionality of software 210. As depicted the software may comprises a number of different software components, with each software component associated with a version number. For example, a first software component 212 may be associated with a version number 6.1.3 while a second software component 214 may be associated with information identifying one or more patches that have been applied to the software. A difficulty arises in comparing version numbers if there is no further details on the format of versions. The difficulty is increased given the flexibility in expressing version numbers. For example some software uses numbers indicating major and minor releases as the version information, others use names as the version information, and some use the digits of the number pi. As an example, a vulnerability may affect kernels "before version 4.17.7." Determining whether a particular version is affected requires particular information about the version numbers. For example, would version 4.17.7rc2 be affected since the "rc" stands for release candidate and was technically released before 4.17.7. Further, would version 4.14.84 be before version 4.17.7. Version 4.14.84 is a long-term stable release that was shipped chronologically after version 4.17.7. Determining affected versions would require specific knowledge of how version numbers are applied. As described in further detail below, in order to allow all software versions to be compared without all software to conform to a common version format, a vulnerability listing object for a particular vulnerability specifies version check information that includes a Boolean expression specifying susceptible versions as well as a version definition specifying how the version is defined.

When a vulnerability to a particular piece of software is found, a vulnerability listing object can be generated. Software developers and/or maintainers may have a web domain. The web domain may also be used for distributing the vulnerability listing objects. For example, a first developer may have a known web domain, web domain 1, and may include a server 218a that stores and distributes a vulnerability listing object 220a. The vulnerability listing object 220a may comprise one or more vulnerabilities affecting one or more software components, and software component versions in the software of the developer associated with web domain 1. Other web domains, depicted as web domain 2 and web domain 3, may also include servers 218b, 218c for storing and distributing vulnerability listing objects 220b, 220c. The vulnerability listing objects 220a, 220b, 220c may be different vulnerability listing objects, although one or more of the vulnerabilities may be found in multiple ones of the vulnerability listing objects. Each of the servers 218a, 218b, 218c may distribute the respective vulnerability listing objects 220a, 220b, 220c from a known network accessible address. The network accessible address may be specified by, for example, a base location comprising a website domain and a predetermined location identifier specifying the vulnerability listing object. The predetermined location identifier may be the same for all of the servers 218a, 218b, 218c. For example, the predetermined location identifier used by all of the servers may identify the respective vulnerability listing object as "/vulnerabilities-.xml". The predetermined location identifier may be one of a plurality of predetermined location identifiers. The base location may be for example the web domain of the developer or maintainer. For example, the base location could be "example.com", and so the vulnerability listing object may be retrieved from the network accessible location of "example.com/vulnerabilities.xml". The base location could include subdomains and/or additional path identifiers. For example the network accessible location could be provided by "info.example.com/software/vulnerabilityList/vulnerabilities.xml".

Details of the vulnerability listing object 220c are depicted in FIG. 2. An individual vulnerability listing object 222 includes a vulnerability identifier 224 that can be used to uniquely identify a particular vulnerability. The vulnerability listing object 222 further includes vulnerability check information 226 that is used to automatically determine if a particular piece of software is susceptible to the vulnerability associated with the vulnerability ID 224. Fix information 228 may be included that provides information allowing the vulnerability to be fixed.

In order to automatically determine whether the software 210, or one or more of the software components 212, 214, may be susceptible to a vulnerability, the mobile phone 202 may further comprise instructions stored in memory 208 that configure the mobile phone 202 to provide automatic vulnerability detection functionality 230. The vulnerability detection functionality 230 comprises vulnerability collection functionality 230 and affected software detection functionality 232. The vulnerability collection functionality 230 collects one or more vulnerability listing objects. As described above, different vulnerability listing objects may be located at specific network accessible locations. Accordingly, the vulnerability collection functionality 230 may query one or more locations to retrieve vulnerability listing objects. The locations the vulnerability collection functionality 230 queries may be determined based on for example, predetermined specific locations, software components that are located on the mobile phone 202, or one or more lists of locations which may be stored locally on the mobile phone 202 or on retrieved by the mobile phone 202 from a remote location.

Each vulnerability listing object may specify one or more vulnerabilities. For each specified vulnerability, the vulnerability listing object specifies version check information to indicate one or more versions of software that are affected by the vulnerability. The affected software detection functionality 234 uses vulnerability listing objects, for example those collected by the vulnerability collection functionality, to determine if any software on the mobile phone 202 is susceptible to the vulnerabilities in the vulnerability listing objects. The affected software detection functionality 234 may compare the vulnerabilities to the software versions to determine if any of the vulnerabilities apply to the software. Additionally or alternatively the software detection functionality 234 may compare versions of software to the vulnerabilities in the one or more vulnerability listings. If any of the software on the mobile phone is determined by the affected software detection functionality 234 to be affected by a particular vulnerability, the affected software detection functionality 234 may take remediation actions, which may include for example, alerting a user of the vulnerability, automatically determining and applying one or more fixes to address the vulnerability, disabling the software component or other actions as may be deemed appropriate by a user or system administrator.

Figure 3:
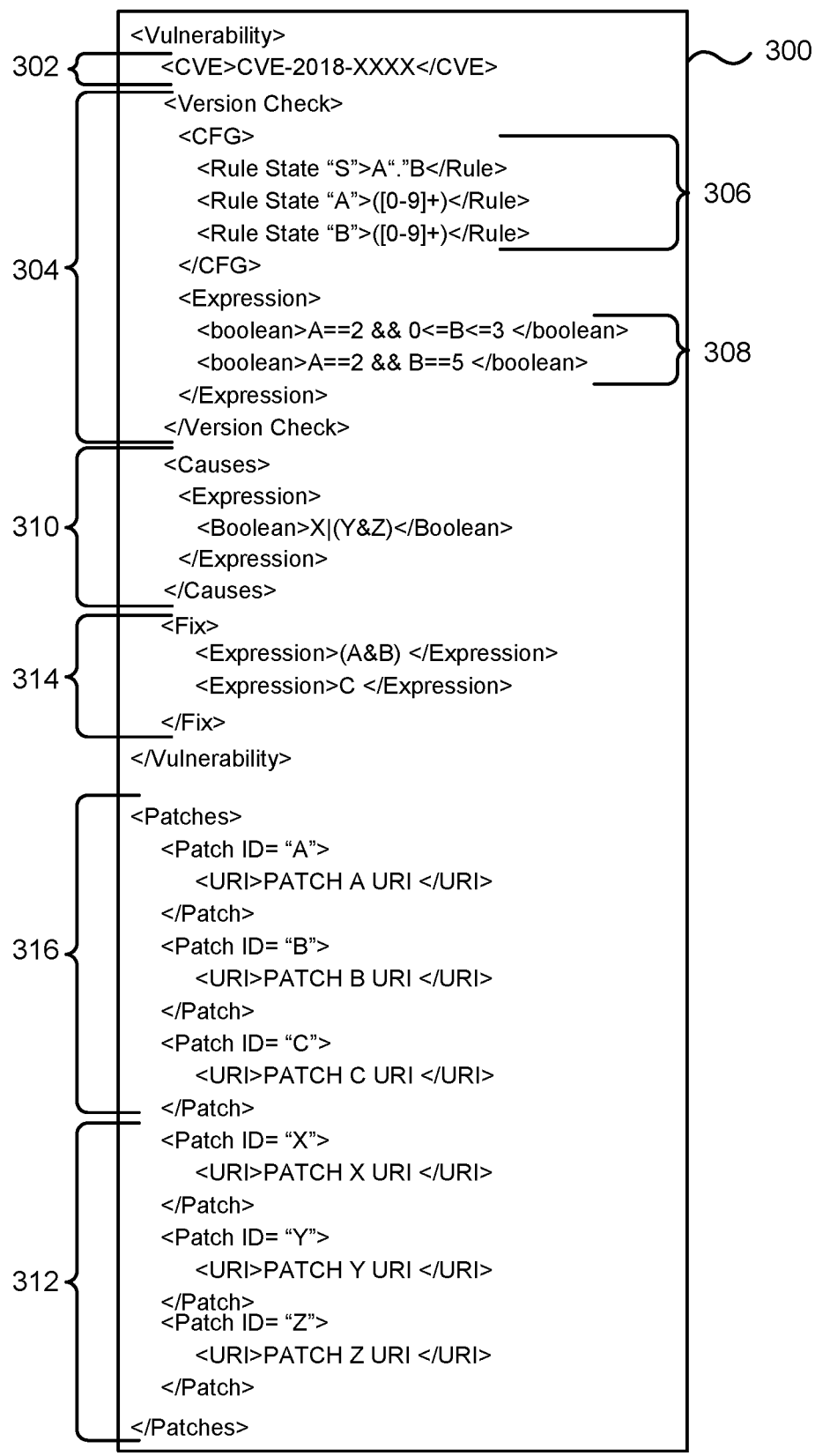
FIG. 3 depicts details of a vulnerability listing object.

FIG. 3 depicts details of a vulnerability listing object. The vulnerability listing object 300 is depicted as a single XML document, however the vulnerability listing object can be expressed in alternative formats. Regardless of the particular format of the vulnerability listing object 300, it comprises at least an identifier of a vulnerability 302. The vulnerability identifier may be provided as a common vulnerabilities and exposures (CVE) value, which allows known vulnerabilities to be referenced. Other identifier formats may be used for uniquely identifying the vulnerabilities. The vulnerability listing object 300 depicts only a single vulnerability, however multiple different vulnerabilities may be included in the same vulnerability listing object.

In addition to the unique vulnerability identifier, each vulnerability in the vulnerability listing object includes details for identifying software that is affected by the vulnerability. The affected software may be identified using a version of the software. In order to allow different version formats to be checked automatically regardless of the particular format, the software version information is specified using version check information that specifies one or more version rules 306 providing a version definition of how a software version number is specified. The version rules include at least one rule providing a symbol rule that identifies the portions of the version. The first rule depicted in FIG. 3 specifies that the version sequence "S" comprises a first token A, followed by a period, ".", and then another token B. The rules further specify the rules for the individual tokens. For example, the second rule specifies that the first token CA' can be one or more numbers between 0-9 and the second rule specifies that the second token CB' can be one or more numbers between 0-9. According to the version rules 306, a valid version would be, for example, 4.12, 12.3 etc. An invalid version number would be for example 4-42, 1.a, etc. The version rules are a grammar used in tokenizing a software version sequence when comparing versions. The example version rules 306 form a context-free grammar.

In addition to the version rules 306, the version check information 304 further comprises one or more Boolean expressions 308 specifying version numbers of software according to the one or more version rules. If any of the one or more Boolean expressions 308 are evaluated as true, than the software is susceptible to the identified vulnerability. For example, if the software version is 1.5, the tokenization according to the version rules 306 would result in A=1 and B=5, and applying the version number Boolean expressions according to the version results would result in evaluating the Boolean expressions 1==2 && 0<=5<=3, and 1==2 && 5==5, both of which would evaluate as false. Accordingly, version 1.5 of the software would be determined to be not affected by the identified vulnerability. Supported operators in the Boolean expression should contain standard mathematical operators, such as for example == (equal to), > (greater than), < (less than), >= (greater than or equal), <= (less than or equal), != (not equal), && (Boolean and), || (Boolean or), ! (Boolean not), brackets, etc. as well as a function that returns the length of a version token at a minimum.

In addition to specifying affected software by the software version, if the source code of the software is available as is often the case of open source software, the susceptible software may be specified by identifying one or more patches that include the vulnerability. A vulnerability is introduced into software by the addition, removal, or modification of code, which can be represented in software through applying one or more patches. Accordingly, it is possible to specify one or more software patches which, if present, indicate that the software is susceptible to the vulnerability. The details identifying susceptible software may comprise a Boolean expression 310 specifying one or more software patches that introduced the vulnerability, or that have the vulnerability. As depicted in FIG. 3, the Boolean expression 310 identifies the vulnerability being present if patch X is present or if both patches Y and Z are present. The susceptible software details further include patch details 312 of each of the one or more vulnerable software patches specified in the Boolean expression including an indication of a location for retrieving the respective vulnerable software patch. The patch details 312 may comprise a patch identifier or token used to identify the particular patch in the Boolean expression 310 as well as a network location, depicted as being provided by a URI, where the patch can be retrieved from.

As described above, it is possible to specify what software is susceptible to a vulnerability by specifying either the vulnerable software versions or specifying patches that introduced the vulnerability. Once a vulnerability has been identified as affecting software, it is possible to take one or more actions. For example, the action may be to notify a user or administrator of the vulnerability, quarantine the affected software or the device running the software until remedial action is taken, etc. The vulnerability listing object 300 may further include information 314 on fixing the vulnerability. Vulnerabilities can often be fixed by applying one or more patches to update the vulnerable software. The fix information 314 may be expressed as one or more Boolean expressions that specify which patches need to be applied to fix the vulnerability. For example, the fix information 314 indicates that vulnerability can be addressed by applying both patches A and B or by applying patch C. If the fix information is included in the vulnerability listing object, the patches may be applied automatically if the software is determined to be vulnerable. The vulnerability report 300 further includes patch details 316 for each patch mentioned in the Boolean expression 314 including an indication of a location for retrieving the respective vulnerable software patch. The patch details 316 may comprise a patch identifier or token used to identify the particular patch in the Boolean expression 314 as well as a network location, depicted as being provided by a URI, where the patch can be retrieved from. The vulnerability report may specify the software or product, in addition to the particular version or versions, affected by the vulnerability. The software or product may be specified in various ways. For example the information may be included in the URI. Additionally or alternatively the product being referred to in a vulnerability report may be identified by additional information or metadata included in the vulnerability report.

As described above, the vulnerability detection functionality 230 uses vulnerability listing objects to determine if software is susceptible to one or more vulnerabilities, and possibly taking one or more actions if vulnerabilities are identified in the software. The vulnerability listing objects may be stored in network accessible locations that follow a common naming convention. The naming convention may use a base location comprising a domain followed by a predetermined location identifier. For example, if the vulnerability listing object is stored as an XML object, the network accessible location could be "example.com/vulnerabilities.xml". By conforming the network accessible location to the naming convention, it is possible to easily locate vulnerability listing objects. For example, the listing of known vulnerabilities for BlackBerry™ related software and devices could be accessible from "blackberry.com/vulnerabilities.xml". The base location may further specify subdomains, or different paths for the vulnerabilities. For example the base location could be for example "security.blackberry/bbm". The vulnerability listing objects for other software or devices may be retrieved by changing the base location.

Figure 4:
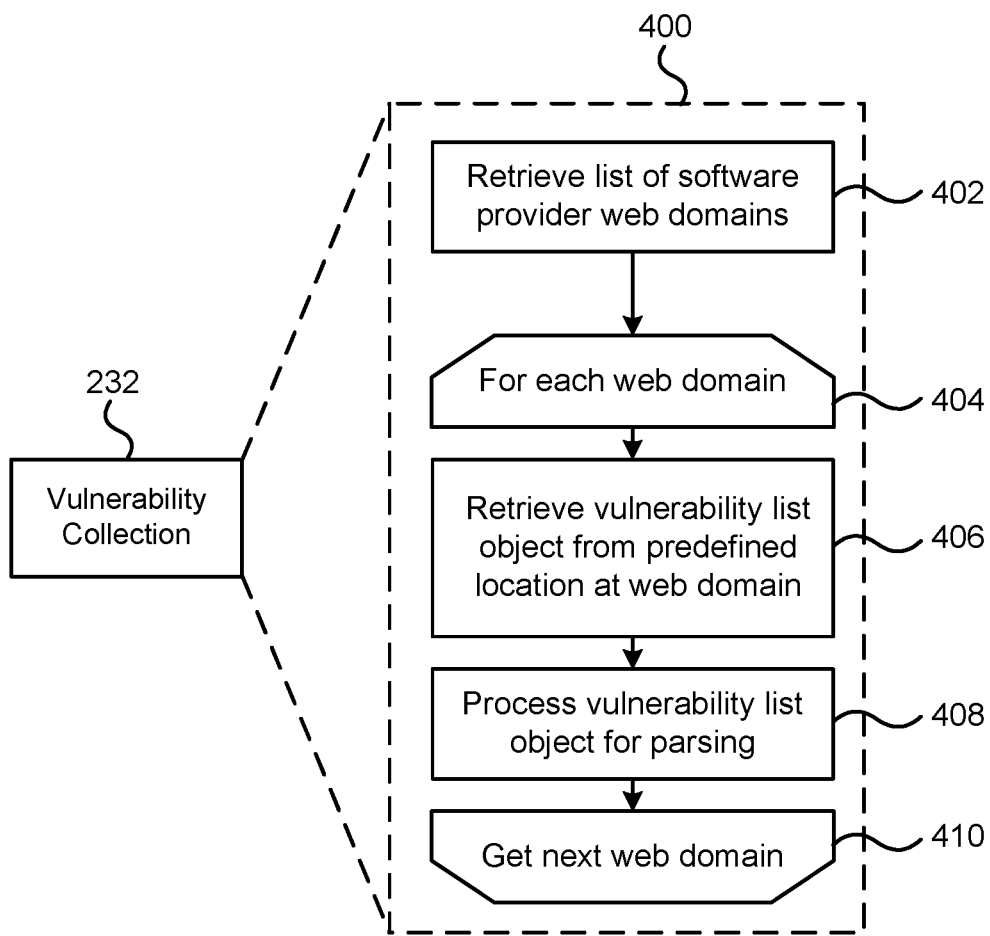
FIG. 4 depicts a method of collecting vulnerabilities.

FIG. 4 depicts a method of collecting vulnerabilities. The vulnerability collection functionality 232 may implement a method 400 for collecting one or more vulnerability listing objects. The method 400 comprises retrieving a list of software provider base locations (402). The list of base locations may be retrieved locally or from a remote location. For example, a device may maintain a list of web domains to check for vulnerabilities locally. The list may be updated manually or automatically. For example, the list could be updated as new software is installed or configured on the device. Additionally or alternatively, the local list of web domains could be updated periodically according to a remotely maintained list. The device may also retrieve, or attempt to retrieve, a list of web domains from a remote location. For example, in a corporate environment, an employee's mobile phone may retrieve a list of web domains from a corporate server that maintains a list of the base locations of software providers/maintainers of software used by the corporation. Regardless of how the list of different base locations are retrieved, each of the base locations (404) is processed to retrieve the vulnerability listing object from the predefined location at the base location (406). The retrieved vulnerability listing object may then be processed (408) and the next base location (410) retrieved and processed (404). Although depicted as retrieving and processing vulnerability listing objects serially, it is possible to retrieve and process the vulnerability listing objects in parallel. Alternatively, all of the vulnerability listing objects could first be retrieved and then processed.

As described above, vulnerability listing objects can be automatically retrieved and processed to automatically detect if software, or devices, are susceptible to vulnerabilities. Each vulnerability listing object may specify one or more vulnerabilities along with information for determining if software, or devices, are susceptible to the vulnerability.

Figure 5:
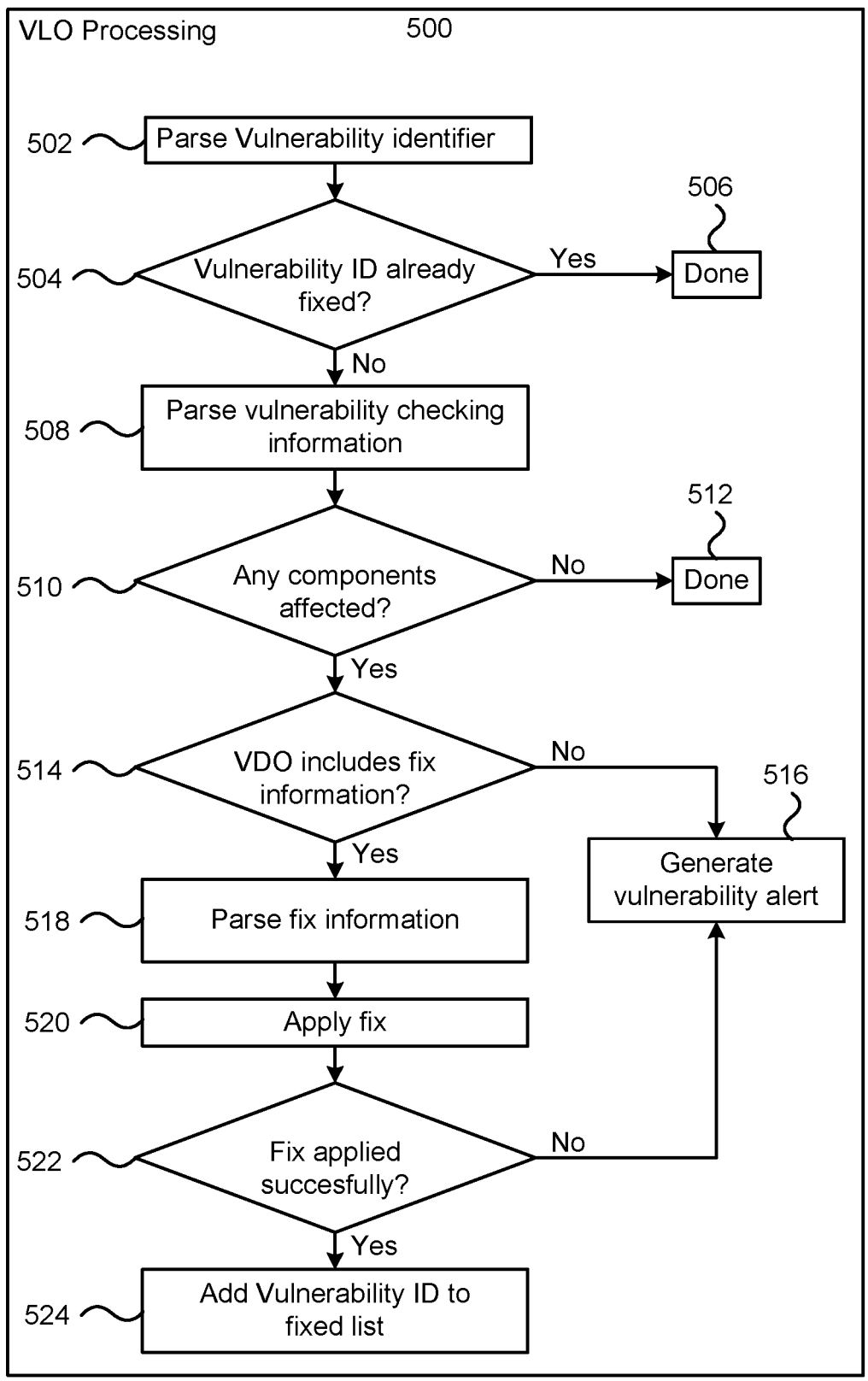
FIG. 5 depicts a method of processing a vulnerability listing object.

FIG. 5 depicts a method of processing a vulnerability listing object. The vulnerability listing object processing 500 depicted may be implemented, for example, by the vulnerability collection functionality 232. The processing parses a vulnerability identifier (502) from the vulnerability listing object. The processing may determine if the vulnerability identifier has already been addressed (504) and if it has (Yes at 504) the processing for the particular vulnerability ID may be complete (506). If the vulnerability ID has not been processed (No at 504) the vulnerability checking information specifying software or devices that are susceptible to the vulnerability is parsed (508) and determines if there are any components that are susceptible (510). If no susceptible components are detected (No at 510) the processing for the particular vulnerability listing object is completed (512). If there are affected components (Yes at 510) it is determined if the vulnerability listing object includes any information specifying how to fix the vulnerability (514). If no fix information is included in the vulnerability listing object (No at 514), a vulnerability alert may be generated (516). The vulnerability alert may take numerous forms, including for example a report, an email, a txt message, an indication on a graphical user interface, etc. The generated vulnerability alert provides an alert to a user, administrator, security personnel and/or other appropriate people or locations, that a vulnerability was detected by not fixed. The generated vulnerability alert can prompt an individual or other computing system to investigate the vulnerability and determine further actions, if any, to take. If the vulnerability listing object does include fix information (Yes at 514) the fix information is parsed (518) and the fix, or fixes, applied (520). The processing may check to determine if the fix or fixes were successfully applied (522) and if one or more of the fixes were not applied successfully (No at 522), a vulnerability alert may be generated (516). If the fixes were successfully applied (Yes 522), the vulnerability identifier may be added to a fixed list of vulnerabilities that have been successfully addressed (524). With the vulnerability added to a fixed list, if the same vulnerability identifier is processed again, the processing can be terminated upon checking if the vulnerability ID was already processed (504).

Figure 6:
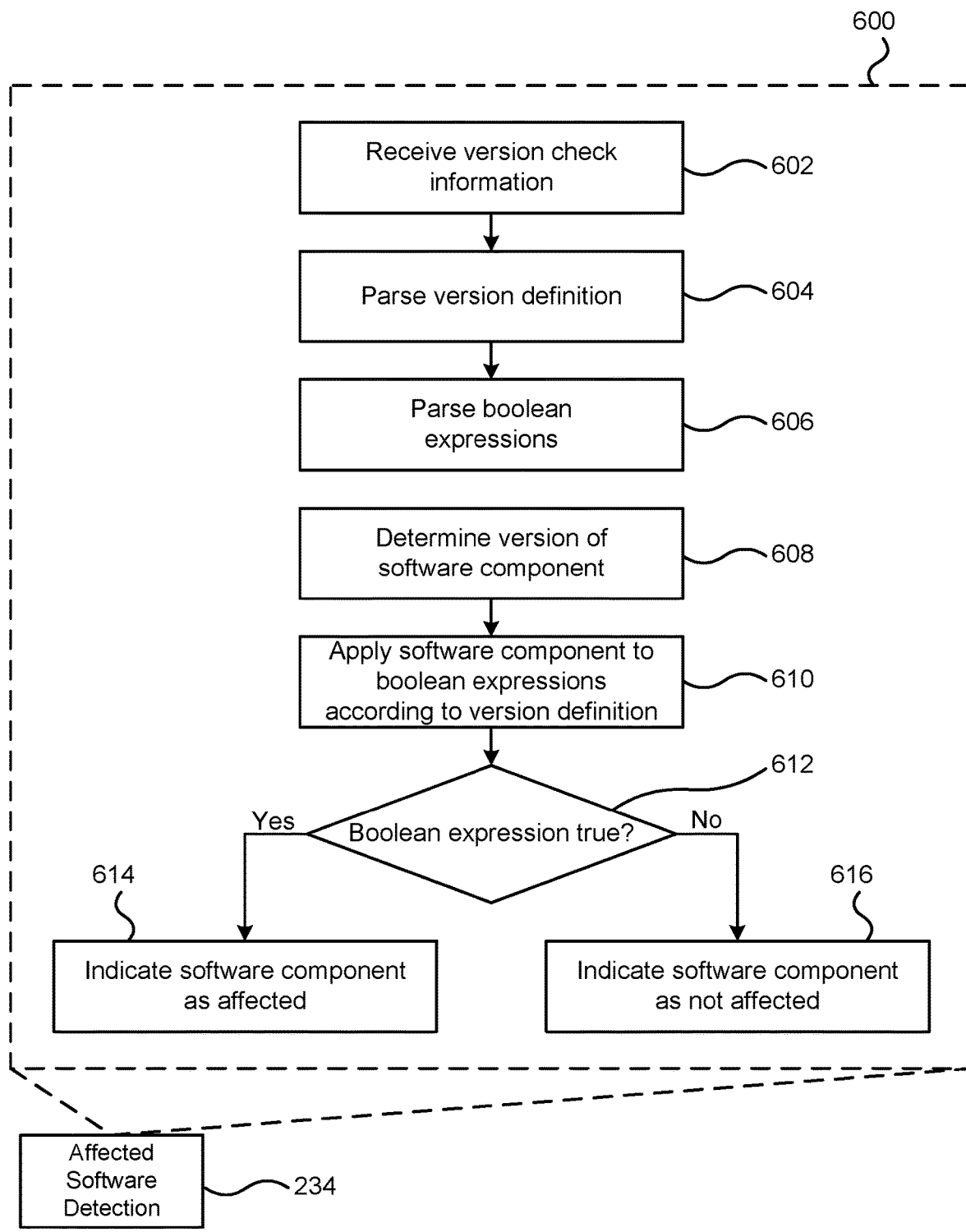
FIG. 6 depicts a method for detecting software affected by a vulnerability.

FIG. 6 depicts a method for detecting software affected by a vulnerability. As described above, the vulnerability listing objects include information that is used in automatically identifying affected versions of the software. The affected software detection functionality described above may implement a method 600 for automatically determining if software is susceptible to vulnerabilities using the information in the vulnerability listing object. The method 600 depicts determining if software is susceptible to a vulnerability based on version check information. The method receives the version check information (602) which may have been parsed from a vulnerability listing object. The version check information comprises version definition rules that indicate how to tokenize the version string of the software, along with one or more Boolean expressions using the tokens to identify a vulnerable version of the software. The version definition specifies how a version sequence is assembled from different tokens as well as allowable values of the tokens. The Boolean expression allows the user's version to be identified as vulnerable or not vulnerable by applying the tokenized version string to the Boolean expression. The version definition is parsed (604) along with the Boolean expression (606). The version of the software being checked is determined (608). The version can be determined in various ways, including for example, querying the software for the version information, retrieving the version from a list of software versions installed on a device, etc. The version sequence is tokenized according to the parsed version definition and applied to the parsed Boolean expressions (610) and it is determined if the Boolean expression evaluates to true (612). If the Boolean expression is true (Yes 612) the software is susceptible to the vulnerability and an indication can be provided that the software is affected (614). If the Boolean expression is not true (No at 612) an indication can be provided that the software is not affected (616). Although described as using the Boolean expressions to indicate software versions that are affected or susceptible to a vulnerability, it is possible to specify what software versions are not affected or susceptible to the vulnerability. If vulnerability reports are able to use Boolean expressions to specify both affected versions or versions not affected, additional metadata may be included in the report to provide an indication of whether a Boolean expression specifies affected versions or specifies unaffected versions.

Figure 7:
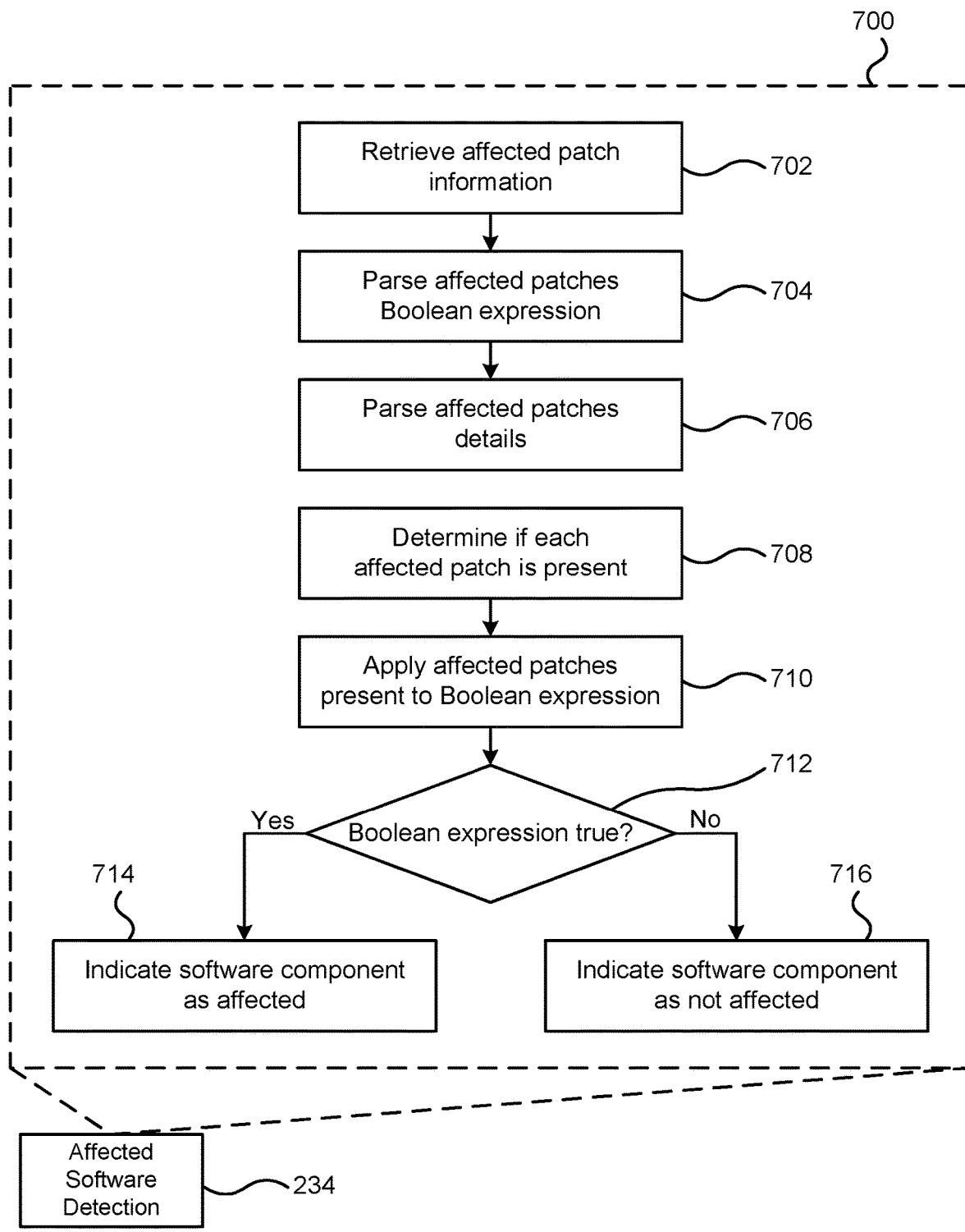
FIG. 7 depicts a further method for detecting software affected by a vulnerability.

FIG. 7 depicts a further method for detecting software affected by a vulnerability. The method 700 is similar to the method 600 described above, but determines susceptibility to a vulnerability based on the presence of one or more patches rather than with version information. The method receives the affected patch information (702) which may have been parsed from a vulnerability listing object. The affected patch information comprises one or more Boolean expressions indicating patch identifiers, or combination of patch identifiers, which if the corresponding patches are present indicate susceptibility to the vulnerability. The affected patch Boolean expression is parsed (704) along with the patch details (706). The patch details are used to determine if each of the respective patches are present in the software or on the device (708). The presence, or absence, of each patch is the applied to the parsed Boolean expressions (710) and it is determined if the Boolean expression evaluates to true (712). If the Boolean expression is true (Yes 712) the software is susceptible to the vulnerability and an indication can be provided that the software is affected (714). If the Boolean expression is not true (No at 712) an indication can be provided that the software is not affected (716).

The above has described the automatic detection of software vulnerabilities with particular reference to FIG. 2 which depicts a mobile phone 202 checking its own software. The same process can be applied to a wide range of electronic devices including laptop computers, desktop computers, networking components such as routers, firewalls, switches etc., vehicles including automobiles, transport trucks, aeroplanes, autonomous vehicles, and Internet of Things (IoT) devices. While it may be desirable to provide an electronic device with functionality for automatically detecting if there is a vulnerability present in the software, firmware and or hardware, it may also be desirable to provide a system for detecting software vulnerabilities in other devices.

Figure 8:
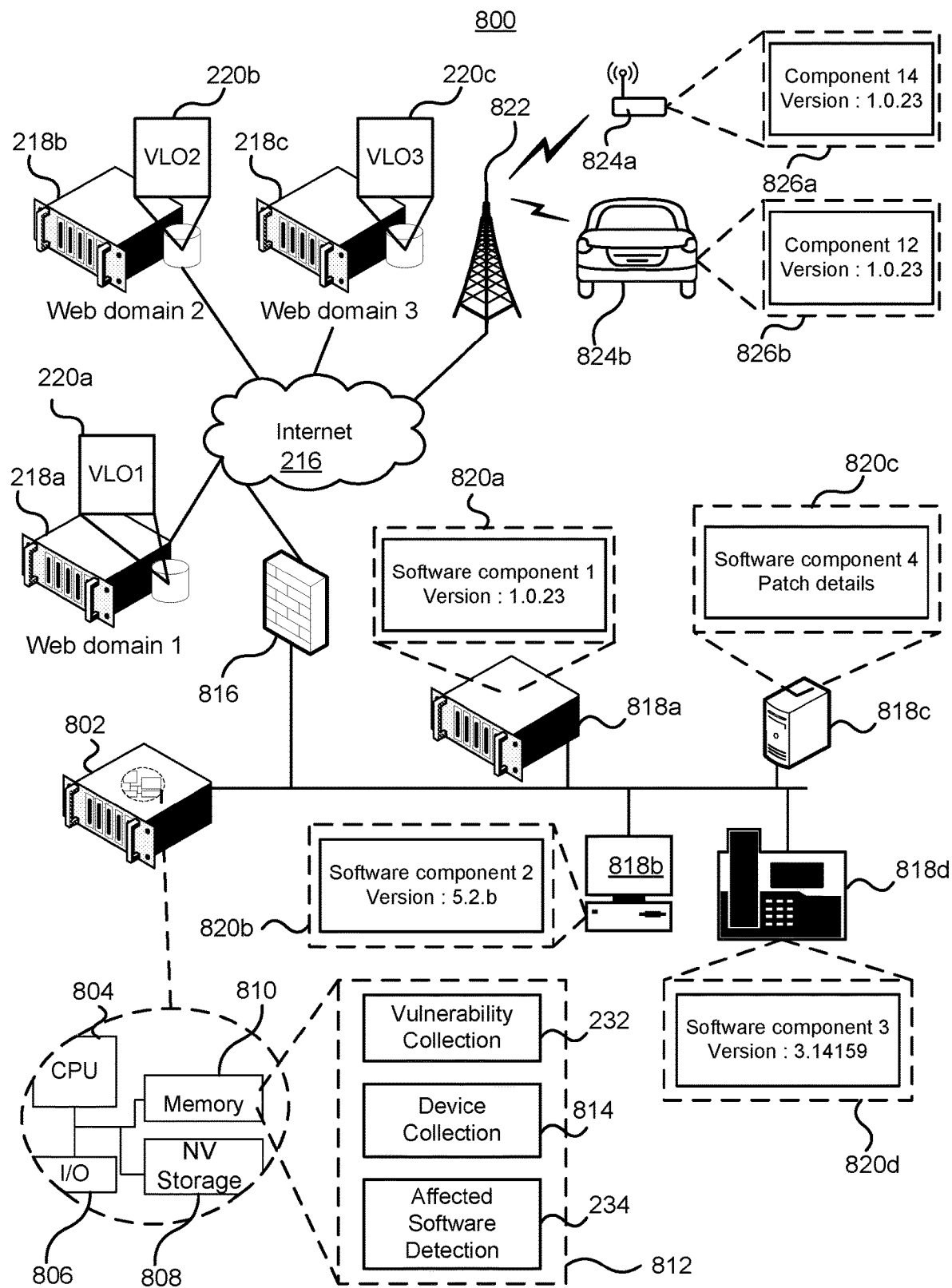
FIG. 8 depicts a further system for determining vulnerabilities affecting software.

FIG. 8 depicts a further system for determining vulnerabilities affecting software. The system 800 is similar to that described above and as such similar components will not be described in further detail. The system includes a computer system 802 comprising a processor 804, one or more input/output (I/O) interfaces 806 for connecting input and output devices to the processor, non-volatile storage 808 such as hard drives, solid state drives, flash memory, ROM, etc., and memory 810 for storing data and instructions. The stored instructions can be executed by the processor and when executed configure the computing system to provide vulnerability detection functionality 812.

The vulnerability functionality 812 includes vulnerability collection functionality 232 which that retrieves one or more vulnerability objects and affected software detection functionality 234 for determining if one or more of the vulnerabilities specified in the one or more vulnerability objects are present in particular software. The vulnerability collection functionality 232 and the affected software detection functionality 234 may be similar to the functionality described above. The vulnerability detection functionality 812 further includes device collection functionality 814 that collects the devices that should be checked. Once the devices to be checked are determined, the affected software detection functionality 234 may determine the software on the devices as described above, for example by querying software on the devices or by retrieving the installed software information from a list or database of installed software for each of the devices. The device collection functionality 814 may collect the devices to check in various ways, including for example from a list of devices that are to be checked or maintained, or by scanning a network for devices. The computer system 802 may be connected to a local network protected by a firewall 816. The computer system 802 may probe the network to determine attached devices that can or should be checked.

As depicted there may be a number of different types of devices attached to a local network, including a server 818a, a desktop computer 818b, a workstation 818c, and a telephone 818d (referred to collectively as devices 818). The devices 818 depicted in FIG. 8 are only illustrative and other types of devices may be included such as routers, switches, printers, environmental control devices and sensors, accesses control devices and sensors, etc. Each of the devices 818 may include software 820a, 820b, 820c, 820d. Although only a single software component is depicted for each of the devices 818 each may have a plurality of different software components present.

In addition to determining if software on devices attached to a local network are susceptible to vulnerabilities, the vulnerability detection functionality 812 may also determine if software present on external devices are susceptible to vulnerabilities. One or more devices, depicted as an IoT device 822a and a vehicle 822b may be communicatively connected to the internet 216 by a wireless infrastructure 824 and may be accessible to the vulnerability detection system in order to provide details of software on the devices 822a, 822b. If the devices 822a, 822b are communicatively coupled to the computer system 802 it may be possible to automatically fix vulnerabilities. If the devices 822a 822b are not communicatively coupled to the system 802, or a communication network more broadly, it may not be possible to fix vulnerabilities automatically. However the vulnerabilities may still be automatically detected if the details of the software 826a, 826b of each device 822a, 822b, such as the version number, is available to the computer system 802. For example, the computer system 802 may maintain a device list along with information of installed software that can be used in determining if devices are susceptible to vulnerabilities.

Figure 9:
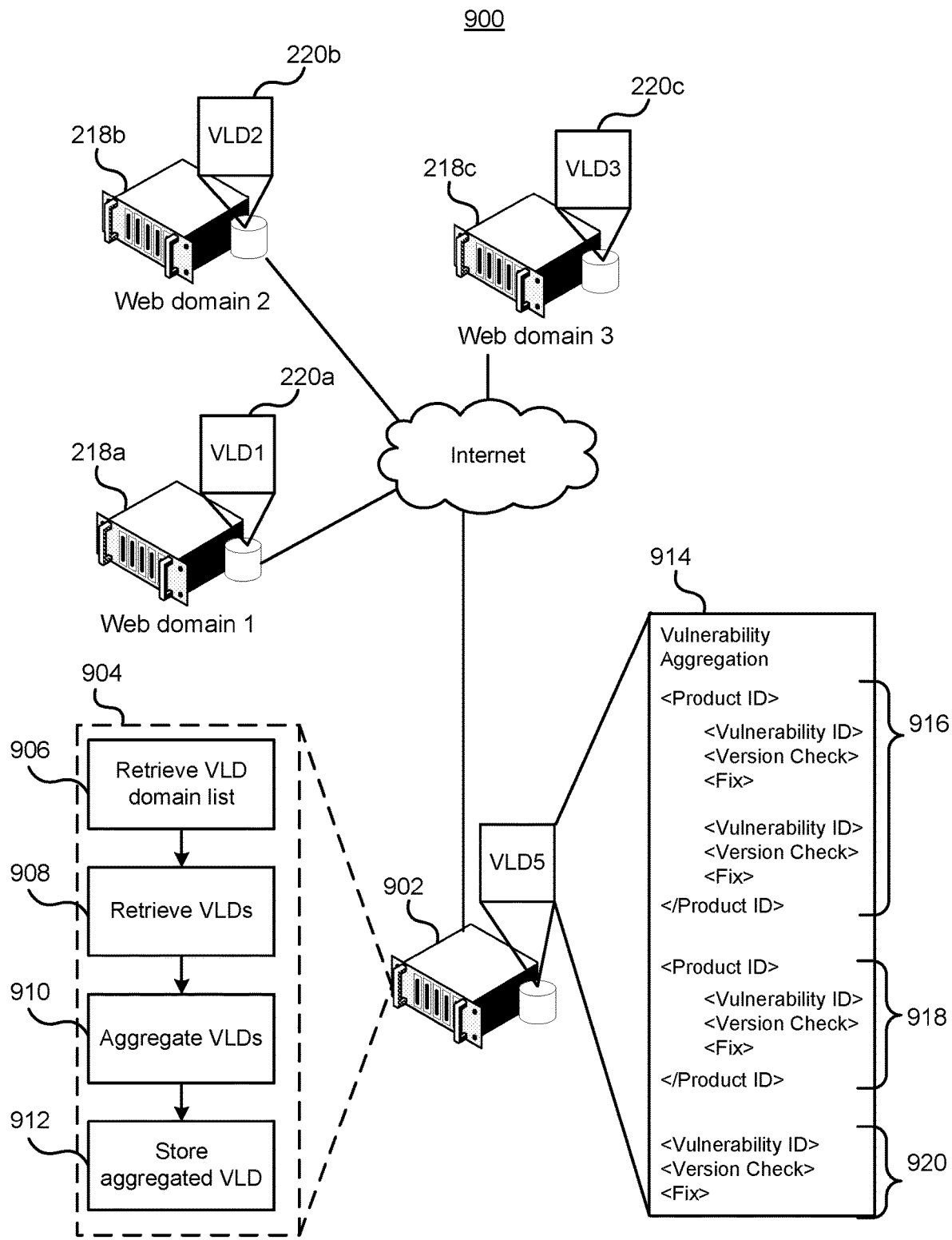
FIG. 9 a system and method of aggregating vulnerability listing objects.

FIG. 9 a system and method of aggregating vulnerability listing objects. The above has described a vulnerability listing object as having one or more vulnerabilities. While a vulnerability listing object may have any number of vulnerabilities that may or may not be related to each other or to the same or similar software, it may be desirable to aggregate similar or related vulnerabilities together. For example, vulnerabilities of different components in a software product or devices may be aggregated together. Additionally or alternatively, vulnerabilities from one or more different software providers may be aggregated into a single vulnerability listing object in order to provide a single location for a number of different vulnerabilities.

The aggregation system 900 may comprises an aggregation server 902 that provides aggregation functionality 904 for aggregating multiple vulnerability listing objects together. The functionality 904 may retrieve a base location list of vulnerability listing objects 906 and retrieve the vulnerability listing objects from the different locations 908. The vulnerability listing objects may then be aggregated together 910 and the aggregated vulnerability listing object stored 912 for access by other devices or processes in determining vulnerabilities of software. The different vulnerability listing objects may be aggregate automatically or manually. The vulnerability listing objects may simply be added together, or they may be processed to possibly group related vulnerabilities together, or to remove repeated vulnerabilities. If vulnerabilities are grouped together in some manner, for example by a software product, the same vulnerability may be included in multiple different vulnerability groupings or in different vulnerability listing objects.

The stored vulnerability listing 914 may include one or more products identified by respective product identifiers 916, 918. Each product may specify one or more vulnerabilities, including a vulnerability identifier, information for determining if software is susceptible to the vulnerability, and possibly information on how to fix the vulnerability. The aggregated vulnerability object may also include ungrouped vulnerabilities. Further, although the aggregated vulnerability listing object depicts specifying the vulnerability details, it is possible to include a reference to a separate vulnerability listing object rather than the details themselves.

The aggregated vulnerability listing objects may include multiple vulnerabilities for a single software product and may be distributed from a location associated with the product. For example, a vulnerability listing object may include all vulnerabilities affecting BlackBerry Messenger (BBM) and may be distributed from a network accessible location of "security.blackberry.com/BBM/vulnerabilities.xml". The vulnerability detection functionality may selectively check vulnerability listings for specific products, such as those installed on a device, by retrieving and processing a vulnerability listing object for the product.

The above has described an approach for software developers, authors, or vendors to notify customers and others about vulnerabilities that have been identified and fixed in their products. This notification is in done in a way that does not require an individual to read the vulnerability report before it can be used. The version check information allows an automated computer process to determine if software versions match a specified version. Vulnerabilities can be automatically checked since affected software versions can be automatically checked against the software version. As such, a vulnerability report can be read and acted upon automatically by a computer system. Similar techniques may be used for automatically detecting, and possibly fixing, vulnerabilities in firmware as well as hardware. Depending on the vulnerability in the hardware it may or may not be possible to fix a particular vulnerability automatically by updating firmware and/or software.

Although certain components and steps have been described, it is contemplated that individually described components, as well as steps, may be combined together into fewer components or steps or the steps may be performed sequentially, non-sequentially or concurrently. Further, although described above as occurring in a particular order, one of ordinary skill in the art having regard to the current teachings will appreciate that the particular order of certain steps relative to other steps may be changed. Similarly, individual components or steps may be provided by a plurality of components or steps. One of ordinary skill in the art having regard to the current teachings will appreciate that the components and processes described herein may be provided by various combinations of software, firmware and/or hardware, other than the specific implementations described herein as illustrative examples.

Numerous additional variations on the methods and apparatus of the various embodiments described above will be apparent to those skilled in the art in view of the above description. Such variations are to be considered within the scope.

What is claimed is:

1. A method for determining if a software component is susceptible to a vulnerability, the method comprising:
    accessing a vulnerability listing object comprising:
        a vulnerability identifier uniquely identifying a software vulnerability; and
        vulnerability causes information for use in determining software affected by the vulnerability, the vulnerability causes information comprising:
            affected patch information specifying a vulnerable patch that associates a patch token with patch details identifying one or more corrective software patches and one or more patch locations for retrieving the one or more corrective software patches; and
            a first affected patch Boolean expression specifying which ones of the one or more corrective software patches should be retrieved from the one or more patch locations and applied to the software to fix the vulnerability;
    determining information indicating which ones of the specified corrective software patches have been successfully applied to the software and which ones of the specified corrective patches have not been successfully applied to the software;
    applying the information to the first affected patch Boolean expression;
    determining whether the first affected patch Boolean expression is true or not true;
    indicating that the software component is susceptible to the software vulnerability when the first affected patch Boolean expression is determined to be true; and
    indicating that the software component is not susceptible to the software vulnerability when the first affected patch Boolean expression is determined to be not true, wherein the vulnerability listing object further comprises version check information comprising:
    one or more version rules providing a version definition of how a software version number is formed from a plurality of tokens; and
    a version Boolean expression using one or more of the plurality of tokens, the version Boolean expression identifying software versions associated with the vulnerability listing object.

2. The method of claim 1, wherein the vulnerability listing object further comprises information for fixing the vulnerability.

3. The method of claim 2, wherein the information for fixing the vulnerability comprises:

a second affected patch Boolean expression specifying one or more corrective patch tokens, which if applied as specified in the second affected patch Boolean expression fix the vulnerability; and corrective patch information for each of the one or more corrective patch tokens each associating the respective corrective patch token with a respective corrective patch location for retrieving the respective corrective patch token.

4. The method of claim 3, further comprising:

determining which of the one or more corrective patch tokens to apply based on the second affected patch Boolean expression;

determining the respective corrective patch location from the corrective patch information;

retrieving one or more corrective patches from the respective corrective patch locations; and applying each of the retrieved corrective patches.

5. The method of claim 4, further comprising:

determining if each of the one or more retrieved corrective patches were successfully applied; and if one or more of the corrective patches were not successfully applied, providing a notification that one or more of the corrective patches were not successfully applied.

6. The method of claim 1, further comprising retrieving the vulnerability listing object from a network location provided by a base location comprising a website domain followed by a predetermined location identifier.

7. The method of claim 6, wherein the base location further comprises one or more of:

a subdomain; and a path identifier.

8. The method of claim 6, wherein the vulnerability listing object further comprises:

a product identifier indicating a software product; and one or more vulnerabilities affecting the product.

9. The method of claim 8, wherein the one or more vulnerabilities are specified within the vulnerability listing object indirectly by referencing a second vulnerability listing object.

10. The method of claim 1, further comprising determining one or more software components to be checked, wherein the software components to be checked are located on one or more of:

a device that the method is performed by; and one or more devices different from the device that the method is performed by.

11. The method of claim 1, wherein the version check information is used to determine if software is vulnerable by:

determining a version number of a software component to be checked for susceptibility to the software vulnerability; and applying the determined version number to the version Boolean expression according to the one or more version rules.

12. A device for determining if a software component is susceptible to a vulnerability, the device comprising:

a processor for executing instructions; and a memory for storing instructions, which when executed by the processor configure the device to:

access a vulnerability listing object comprising:

a vulnerability identifier uniquely identifying a software vulnerability; and vulnerability causes information for use in determining software affected by the vulnerability, the vulnerability causes information comprising:

affected patch information specifying a vulnerable patch that associates a patch token with patch details identifying one or more corrective software patches and one or more patch locations for retrieving the one or more corrective software patches; and a first affected patch Boolean expression specifying which ones of the one or more corrective software patches should be retrieved from the one or more patch locations and applied to the software to fix the vulnerability;

determine information indicating which ones of the specified corrective software patches have been successfully applied to the software and which ones of the specified corrective patches have not been successfully applied to the software;

apply the information to the first affected patch Boolean expression;

determine whether the first affected patch Boolean expression is true or not true;

indicate that the software component is susceptible to the software vulnerability when the first affected patch Boolean expression is determined to be true; and indicate that the software component is not susceptible to the software vulnerability when the first affected patch Boolean expression is determined to be not true, wherein the vulnerability listing object further comprises version check information comprising:

one or more version rules providing a version definition of how a software version number is formed from a plurality of tokens; and a version Boolean expression using one or more of the plurality of tokens, the version Boolean expression identifying software versions associated with the vulnerability listing object.

13. The device of claim 12, wherein the vulnerability listing object further comprises information for fixing the vulnerability.

14. The device of claim 13, wherein the information for fixing the vulnerability comprises:

a second affected patch Boolean expression specifying one or more corrective patch tokens, which if applied as specified in the second affected patch Boolean expression fix the vulnerability; and corrective patch information for each of the one or more corrective patch tokens each associating the respective corrective patch token with a respective corrective patch location for retrieving the respective corrective patch token.

15. The device of claim 14, wherein the executed instructions further configure the device to:

determine which of the one or more corrective patch tokens to apply based on the second affected patch Boolean expression;

determine the respective corrective patch location from the corrective patch information;

retrieve one or more corrective patches from the respective corrective patch locations; and apply each of the retrieved corrective patches.

16. The device of claim 15, wherein the executed instructions further configure the device to:

determine if each of the one or more retrieved corrective patches were successfully applied; and if one or more of the corrective patches were not successfully applied, provide a notification that one or more of the corrective patches were not successfully applied.

17. The device of claim 12, wherein the executed instructions further configure the device to retrieve the vulnerability listing object from a network location provided by a base location comprising a website domain followed by a predetermined location identifier.

18. The device of claim 17, wherein the base location further comprises one or more of:
   a subdomain; and
   a path identifier.

19. The device of claim 18, wherein the vulnerability listing object further comprises:
   a product identifier indicating a software product; and
   one or more vulnerabilities affecting the product.

20. The device of claim 19, wherein the one or more vulnerabilities are specified within the vulnerability listing object indirectly by referencing a second vulnerability listing object.

21. The device of claim 12, wherein the executed instructions further configure the device to determine one or more software components to be checked, wherein the one or more software components to be checked are located on one or more of:
   the device; and
   one or more external devices different from the device.

22. The device of claim 12,
   wherein the version check information is used to determine if software is vulnerable by:
      determining a version number of a software component to be checked for susceptibility to the software vulnerability; and
      applying the determined version number to the version Boolean expression according to the one or more version rules.

* * * * *